Aug. 31, 1965    P. J. OLSEN ETAL    3,203,450
HYDRAULICALLY-ACTUATED VALVE
Filed Sept. 12, 1962    2 Sheets-Sheet 2

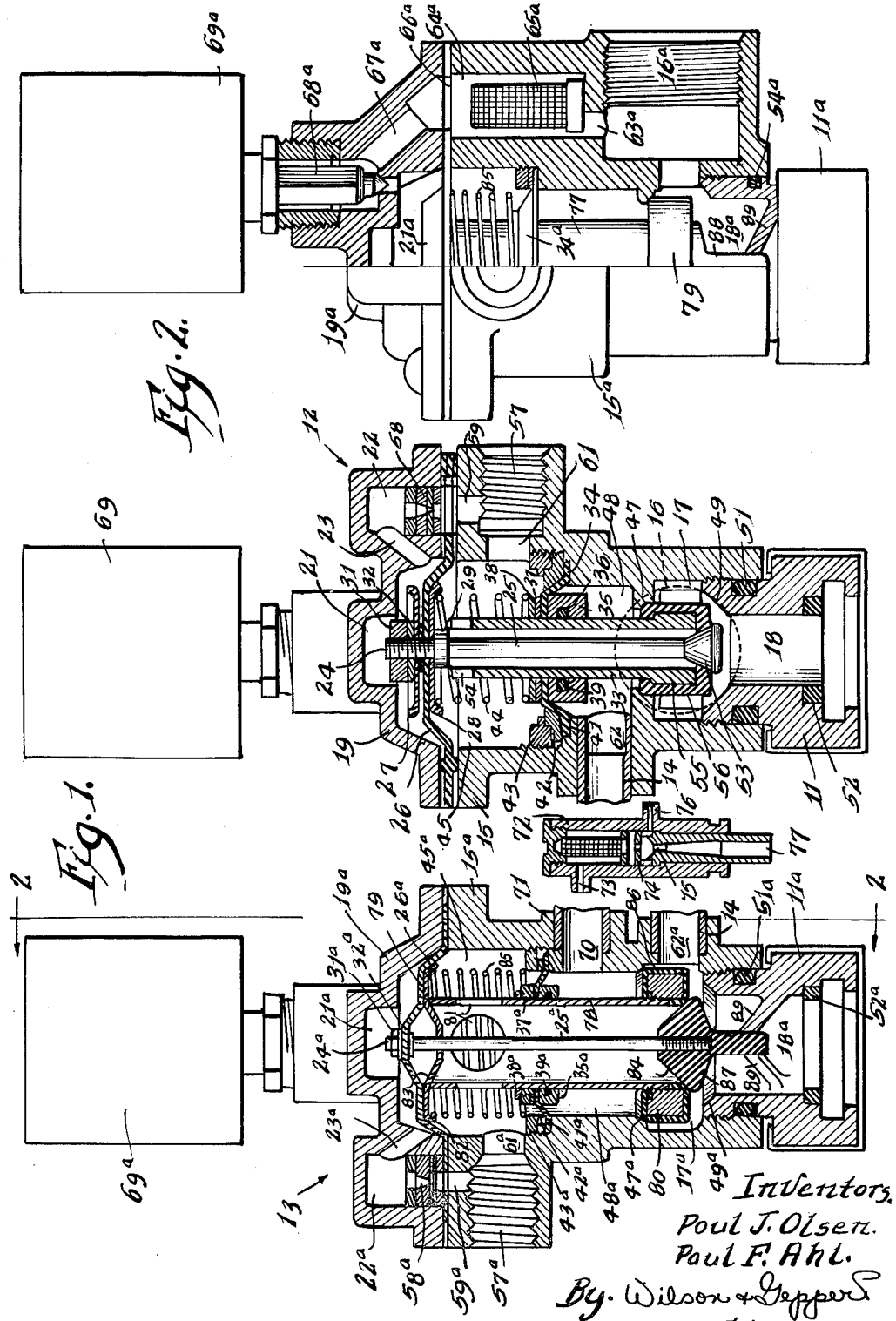

Inventors.
Poul J. Olsen.
Paul F. Ahl.

By. Wilson & Geppert
Attorneys.

United States Patent Office 3,203,450
Patented Aug. 31, 1965

3,203,450
HYDRAULICALLY-ACTUATED VALVE
Poul J. Olsen, Park Ridge, and Paul F. Ahl, Glenview, Ill., assignors to Culligan, Inc., Northbrook, Ill., a corporation of Delaware
Filed Sept. 12, 1962, Ser. No. 223,146
5 Claims. (Cl. 132—630.19)

The present invention relates to an improved hydraulically actuated valve and more particularly to an improved valve member for controlling the direction of flow in automatic water softeners, conditioners and filters during both normal service and regeneration operations and which will prevent the occurrence of the hydraulic principle known as water hammer during operation of the valve, especially in industrial systems where the water pressure and flow rates are substantially greater than encountered in the home.

In the Schulze et al. application Serial No. 29,478, now Patent No. 3,083,728, a directional valve unit is shown and described which during its operation would provide a condition of suddenly checking the water flow in the valve which may produce a water hammer. This condition may occur when the outlet valve opens and unrestricted flow through the valve is allowed for a few seconds before the valve seats and flow is limited by a flow regulator in the line.

Considering the Schulze et al. Patent No. 3,083,728, and especially FIGS. 4 and 5, when the right-hand inlet valve is actuated as shown in FIG. 4, there is no problem of a sudden surge and then sudden reduction of flow in the system due to the flow regulator found in the drain valve. However, when the left-hand outlet valve assembly is actuated as seen in FIG. 5, the upper diaphragm actuates the valve assembly with the valve stem initially moving relative to the plunger tube, and water flows from the inlet directly up through the plunger tube and out to a drain in an unrestricted manner. When the plunger tube shifts to its lower valve seat, water flow is directed through the short conduit into the eductor unit as limited by a flow regulator therein, and this sudden reduction in flow causes water hammer. In industrial operations where the line pressure may be 120 pounds per square inch (p.s.i.), peak pressures occurring due to water hammer may reach values of over 600 p.s.i. As the peak pressure is absorbed by the elastic members of the valve, the weakest member subjected to the peak pressure fails. In this valve assembly, with high peak pressures the plunger tube may buckle.

The present invention obviates this problem of water hammer in industrial installations found in the above mentioned prior valve when operating under relatively high pressures by providing a novel improved valve eliminating any possibility of an unrestricted flow of water through the valve even for a very short interval of time which can build up to a relatively high pressure when the flow rate is suddenly reduced.

An important object of the present invention is the provision of a novel two-part reciprocable valve comprising a plunger tube having an enlarged valve member on one end and a valve stem having a poppet valve at one end adapted to reciprocate within the plunger tube subsequent to movement of the plunger tube to allow flow through the latter. The valve stem has the enlarged poppet valve member at its lower end cooperating with the enlarged end of the plunger tube.

Another object of the present invention is the provision of an improved outlet valve which is especially suitable for industrial water conditioning or treating systems. In industrial systems, water pressures and flow rates are generally higher and larger quantities of water are normally consumed than in the home. Under these higher water pressures and flow rates, the problem of water hammer becomes prevalent.

A further object of the present invention is the provision of a diaphragm-actuated outlet valve wherein a cap or cover is secured to the top of the plunger tube and extends radially outwardly therebeyond to support substantially the entire effective area of the actuating diaphragm. The cap or cover has a central depression therein to allow for movement of the valve stem relative to the plunger tube.

Further objects are to provide a construction of maximum simplicity, efficiency, economy and ease of assembly and operation and such further objects, advantages and capabilities as will later more fully appear and are inherently possessed thereby.

In the drawings:

FIGURE 1 is a vertical cross-sectional view of an illustrative embodiment of an automatic control valve assembly for a water softener and embodying the novel outlet valve of the present invention with the valve shown in its normal service position, and an eductor shown on a reduced scale.

FIG. 2 is a view, part in end elevation and part in vertical cross section taken on the line 2—2 of FIG. 1 and showing the improved outlet valve.

Figure 4:
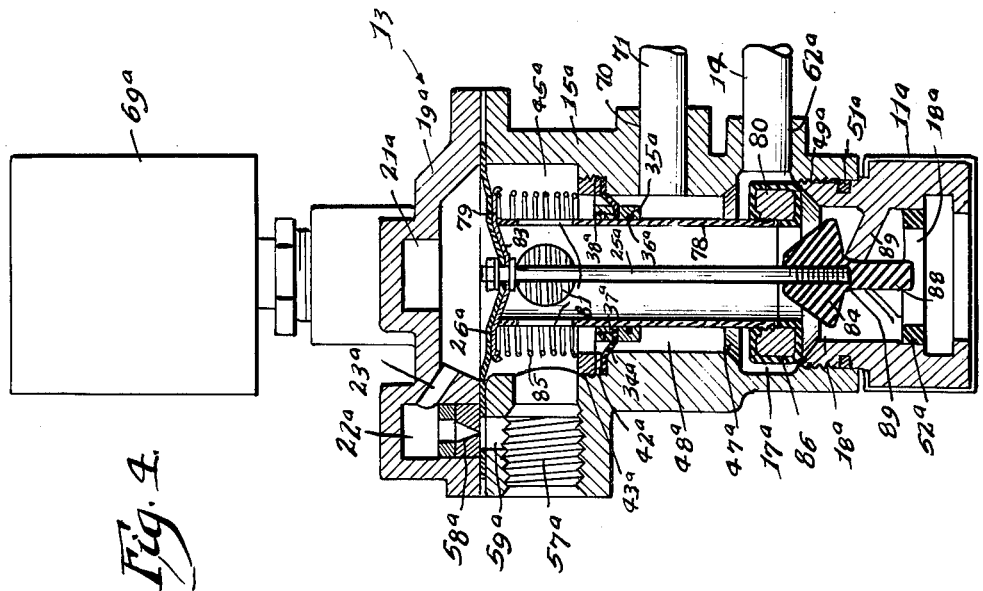
FIG. 4 is a vertical cross-sectional view similar to FIG. 3 but showing the poppet valve moved to its open position.

Referring more particularly to the drawings in which is shown an illustrative embodiment of the present invention, FIG. 1 discloses a directional valve assembly which is adapted to be connected to a water softener or conditioner (not shown) through fittings 11 and 11ª connected to the inlet and outlet of the softener. The directional valve assembly illustrated in this application is generally similar to the valve shown in the Schulze et al. patent application Serial No. 29,478, now Patent No. 3,083,728, and has an inlet valve unit 12 and an outlet valve unit 13 connected by a short by-pass conduit 14. The valve unit 12 includes a valve body 15 having an inlet 16 leading to a main chamber 17 through a communicating port. A bore or passage 18 extends downwardly from the chamber 17 into the fitting 11 leading to the inlet of the water softener.

The valve body 15 is provided at the top with a hollow diaphragm cap 19 secured thereto and having spaced chambers 21 and 22 joined by a connecting channel 23. In the actuating chamber 21 projects the upper threaded end 24 of a valve stem 25 to which is attached a resilient or rubber diaphragm 26. The diaphragm is located between upper and lower dished plates 27 and 28 with the lower plate 28 seated on an enlargement or shoulder 29 on the valve stem, and the upper plate bears against the diaphragm 26 and is held in place by a lock nut 31 and lock washer 32 on the threaded end 24. The outer periphery of the diaphragm 26 is clamped between the flanged periphery of the cap 19 and the valve body 15.

The valve stem 15 is substantially completely surrounded by a plunger tube 33. A second diaphragm 34 is secured to the plunger tube 33 by means of a sleeve 35 having an inwardly opening channel 36 and an annular shoulder for receiving the central portion of the diaphragm. A collar 37 above the diaphragm 34 clamps the central portion of the diaphragm onto the shoulder. A snap ring 38 anchored to the plunger tube 33 abuts an annular flange on the sleeve 35, said flange locking the sleeve and collar 37 together due to the flange being formed over the adjacent edge of the collar. An O-ring 39 within the channel 36 provides for sealing contact with the exterior of the plunger tube 33.

The outer periphery of the diaphragm is secured to the valve body 15 between a shoulder 41 formed on the inner surface of the valve body and a retainer ring 42. An externally threaded lock nut 43 is threadedly engaged with inner threads formed on the internal surface of the valve body 15 adjacent the shoulder 41. An expansion or coil spring 44 is seated at its lower end against the snap ring 38 adjacent the collar 37 with its upper end seated against the lower diaphragm plate 28. The space between the diaphragms 26 and 34 forms a drain or intermediate chamber 45 communicating with a drain port 57.

An annular valve seat 47 in the valve body 15 is positioned above the main inlet 16 so as to form a by-pass chamber 48 below the diaphragm 34 and above the valve seat. A second annular valve seat 49 formed on the fitting 11 is spaced below the first mentioned seat 47 and defines the lower limit of the main chamber 17. Sealing O-ring 51 is mounted between the fitting 11 and the valve body 15, and a gasket or washer 52 is mounted within the fitting 11 to provide a water tight seal with the water conditioner.

The valve stem 25 extends through a substantial length of the valve body 15 and terminates at its lower end in a conical valve 53 and the plunger tube 33 encompasses but is spaced from the valve stem to provide an annular passage therebetween. The plunger tube is longitudinally slotted at 54 at its upper end to provide space for the flow of liquid to the chamber 45 when the lower diaphragm plate 28 abuts the top of the tube.

At its lower end the plunger tube has an enlargement 55 which is covered with an elastic or sealing covering forming a valve member 56 adapted to be lowered into contact with the valve seat 49 at the upper end of the fitting 11 or raised into contact with the valve seat 47.

The chamber 22 communicating with the chamber 21 through the channel 23 also communicates with a drain port 57 through an elastic flow control 58, an aligned opening in the upper diaphragm 26 and a passage 59 opening into the drain port. This port 57 also communicates with the drain chamber 45 through a passage 61. The by-pass chamber 48 communicates with conduit 14 through a by-pass port 62.

In general, the valve units 12 and 13 are identical and like parts in the valve unit 13 will be designated with the same reference numeral as for the valve unit 12 with the addition of a superscript $a$. With reference to actuation of the diaphragm 26, the identical structure is shown in FIG. 2 for the valve unit 13. The main port $16^a$ is provided with a passage $63^a$ leading to a cylindrical chamber $64^a$ having a filter screen $65^a$. This chamber is connected to the chamber $21^a$ through an aligned opening $66^a$ in the diaphragm $26^a$ and a port or passage $67^a$.

Into the junction of passage $67^a$ with the chamber $21^a$ projects a plunger or valve member $68^a$ which is controlled by a solenoid $69^a$. A two circuit timer (not shown) controls the solenoids 69 and $69^a$.

The opposite end of the by-pass conduit 14 communicates with a by-pass port $62^a$ leading into the main chamber $17^a$ of the valve unit 13 rather than into the chamber $48^a$ above the valve seat $47^a$. As previously stated the structure of the valve unit 13, except for the reciprocating valve mechanism is identical with the valve unit 12 and like numerals with the superscript $a$ are used. An eductor port 70 communicates with the intermediate or by-pass chamber $48^a$ and has a conduit 71 leading to an eductor 72 through the port 73. Flow through the eductor is controlled by a flow control 74 above a suction port 76 which communicates with the throat 75 of the eductor and with a source of brine. The liquid passing through the eductor exits at 77 directly into the water conditioner as more fully explained in the Schulze et al. application Serial No. 29,478, now Patent No. 3,083,728.

The valve assembly in this valve unit 13 includes the valve stem $25^a$ secured at its upper threaded end $24^a$ to an actuating diaphragm $26^a$ by a lock nut $31^a$ and lock washer $32^a$. A hollow plunger or plunger tube 78 encompasses the valve stem $25^a$ and includes a cover plate 79 secured to the upper end of the tube and an enlarged main valve 80 threadedly secured or affixed to the opposite end. Just below the cover plate, the plunger tube 78 includes equally spaced openings 81 communicating with the drain chamber $45^a$.

The cover plate is of a diameter substantially the same as the internal diameter of the chamber $45^a$ and in its normal position supports substantially the total effective area of the diaphragm $26^a$. The cover plate 79 has a downwardly turned outer peripheral edge 82 and a central depressed area 83 within the plunger tube 78. The depressed area 83 is substantially the same in area as the poppet valve 84 secured to the lower end of the valve stem $25^a$. However, the effective area of the diaphragm $26^a$ is equal to the area supported by the cover plate 79 plus about one-half the unsupported diaphragm area.

An expansion spring 85 seats at its upper end against the cover plate 79 and at its lower end seats against an annular shoulder of the externally threaded lock nut $43^a$ bearing at its lower end against a slip or retainer ring $42^a$. The spaced elastic diaphragm $34^a$ separating the chambers $45^a$ and $48^a$ has its periphery anchored between the retaining ring $42^a$ and the shoulder $41^a$ formed on the interior of the valve body $15^a$. The central or inner periphery of the diaphragm $34^a$ is secured to the plunger tube 78 by the diaphragm assembly including a sleeve $35^a$ encompassing the plunger tube and having an inwardly opening annular groove $36^a$ for a sealing ring $39^a$. The upper portion of the sleeve is reduced in diameter and externally threaded to cooperate with an internally threaded collar $37^a$. The internal periphery of the diaphragm $34^a$ is clamped between the sleeve $35^a$ and the lock nut $37^a$. A snap ring $38^a$ is mounted on the plunger tube 78 to abut the upper end of the collar $37^a$.

The drain port $57^a$ communicates with the chamber $45^a$ and also communicates with the passage $59^a$ entering at right angles from the chamber $22^a$. A flow regulator $58^a$ is positioned below the chamber $22^a$ and an opening in the actuating diaphragm $26^a$ is aligned with the passage $58^a$.

The enlarged main valve 80 has an encompassing elastic or sealing covering 86 and is adapted to be elevated to engage the valve seat $47^a$ and lowered to engage the valve seat $49^a$ between the main chamber $17^a$ and the passage $18^a$. The poppet valve 84 is formed of rubber or resilient material and has an upwardly tapering body with a generally flat bottom 87 and a depending centrally positioned projection 88 to aid in guiding the reciprocating movement of the poppet valve and valve stem. Three inwardly and upwardly extending arms 89 in the passage $18^a$ terminate short of intersection to provide sufficient space to receive the projection 88 and act as guide means therefor during reciprocation of the valve.

*Operation*

As previously stated, during service operation, hard water entering the valve unit 12 through inlet 16 passes into chamber 17 and passage 18 to the water softener inlet. The valves 56 and 80 are in their elevated positions engaging the valve seats 47, $47^a$ and the conical valve 53 and the poppet valve 84 are elevated and abutting the valves 56 and 80 respectively to close the plunger tubes 33 and 78. The plungers 68, $68^a$ are normally seated in and close the ports 67 and $67^a$.

Treated water emerges from the water softener outlet through the passage $18^a$ and into the chamber $17^a$ of the outlet valve unit 13. This treated water can then exit through the outlet $16^a$ (FIG. 2). Also a small amount of water will enter the outlet 77 in the eductor 72 and pass through the port 76 to a brine tank (not shown) to provide brine for the next regeneration cycle.

When the water conditioning material becomes exhausted and regeneration is to be effected, the timer actuates the solenoid 69 to increase the pressure exerted in the chamber 21 on the diaphragm 26 and reciprocate the valve 56 and conical valve 53. As disclosed in the Schulze et al. application Serial No. 29,478, now Patent No. 3,083,728 the line from the drain port 57 contains a flow control not shown in this application. Although the conical valve 53 opens prior to the valve 56 seating on valve seat 49, there is no sudden change in flow rate to produce a condition which may cause water hammer.

Hard water then enters inlet 16 and main chamber 17 and passes into the chamber 48 and through the conduit 14 to enter the chamber 17$^a$ of the valve unit 13 where the hard water is available for service via outlet port 16$^a$. The water in the chamber 17$^a$ also passes through the passage 18$^a$ into the water softener to provide an upflow backwash operation with the effluent passing through the plunger tube 33 to the drain chamber 45 and out the drain port 57.

To initiate regeneration, the solenoid 69 remains energized and the solenoid 69$^a$ is now energized to withdraw the valve member 68$^a$ and open passage 67$^a$ to the chamber 21$^a$ thus increasing the pressure exerted on top of actuating diaphragm 26$^a$. The plunger tube 78, valve stem 25$^a$ and their associated main valve 80 and poppet valve 84 reciprocate in a two step operation to be explained later to move the main valve 80 from valve seat 47$^a$ to the lower seat 49$^a$ and the passage through the plunger tube 78 is then opened.

Liquid from the by-pass conduit 14 enters the by-pass port 62$^a$ and the chamber 17$^a$ and is available to service through the outlet 16$^a$. Flow then occurs into chamber 48$^a$, through port 70 and conduit 71 to the inlet port 73 in the eductor 72. Liquid passes through the flow control 74 in the eductor and then through a restricted throat 75 adjacent the port 76 to create a vacuum in the eductor and draw brine from a brine tank through the port 76 to mix with the water, and the diluted brine enters the water softener from the outlet 77.

The effluent during regeneration enters both fittings 11 and 11$^a$ and passes through both plunger tubes 33 and 78 to the drain ports 57 and 57$^a$, respectively. A valve in the drain lines from these ports at a junction thereof prevents flow from port 57 as long as there is flow from port 57$^a$. This valve is shown in the above mentioned Schulze et al. application Serial No. 29,478, now Patent No. 3,083,728, and forms no part of the present invention.

When the brine is exhausted, the hard water continues to flow to rinse the softening material, and when the rinse is completed, the timer de-energizes the solenoids 69 and 69$^a$. Water trapped in the chambers 21 and 21$^a$ can now pass to the drain ports 57 and 57$^a$ through channels 23 and 23$^a$, chambers 22 and 22$^a$, flow regulators 58 and 58$^a$, and passages 59 and 59$^a$ respectively. As the pressure decreases in chambers 21 and 21$^a$, water pressure on the diaphragms 34 and 34$^a$ tends to force the plunger tubes 33 and 78 and their valves 56 and 80 and the conical valve 53 and the poppet valve 84 to their elevated positions for the next service cycle.

If the poppet valve 84 opens before the main valve 80 approaches and seats upon the valve seat 49$^a$, an unrestricted flow of water from the by-pass port 62$^a$ will occur through the plunger tube 78 to drain as there is no flow control in the drain line from port 57$^a$, followed by a sudden decrease in flow as the main valve 80 seats and the flow control through the valve assembly is restricted by the flow control 74 in the eductor 72. This sudden reduction in flow may cause water hammer which may cause severe damage to the plunger tube. However, in utilizing the novel cover plate 79 of the present invention, this problem has been obviated.

Figure 3:
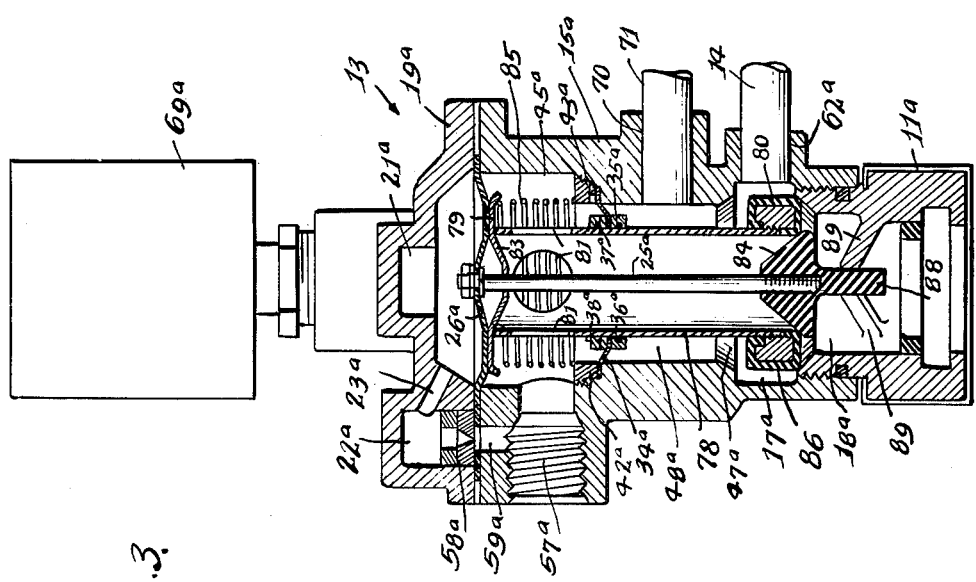
FIG. 3 is a vertical cross-sectional view showing the improved outlet valve of FIG. 1 during actuation for regeneration with the main valve and plunger tube shifted to a second position.

With reference to FIGS. 1, 3 and 4, FIG. 1 shows the improved valve unit 13 in its normal position during a service operation. When the solenoid 69$^a$ is actuated to withdraw the plunger 68$^a$ and allow communication of chamber 21$^a$ with fluid pressure, the main valve 80 and poppet valve 84 open in two stages. Pressure on the diaphragm 26$^a$ bears on the cover plate 79, and since the area of the diaphragm contacting the cover plate is greater than the area of the main valve 80 seated against the valve seat 47$^a$, the cover plate, plunger tube 78, main valve 80, valve stem 25$^a$ and poppet valve 84 are moved downward simultaneously until the main valve contacts the valve seat 49$^a$ (FIG. 3). During this time, the poppet valve 84 remains in engagement with the plunger tube 78 and flow is initiated to the eductor unit 72 and its associated flow regulator 74 without the opening of the drain port 57$^a$. When the main valve 80 engages the valve seat 49$^a$, the area of the diaphragm over the depressed area 83 of the cover plate 79 moves downward to open the poppet valve 84 (FIG. 4). This double action opening of the main valve 80 and poppet valve 84 prevents any unrestricted flow of water which could result in a water hammer.

Likewise, when the solenoid 69$^a$ is de-energized, a double action or two-stage closing movement occurs. The upward movement of the diaphragm 26$^a$ is controlled by the flow regulator 58$^a$ in the passage 59$^a$ leading to the drain port 57$^a$. This prevents line pressure from slamming the main valve 80 to its upper valve seat 47$^a$ which could cause water hammer by suddenly stopping flow. The small volume of water vented from above the diaphragm 26$^a$ allows the poppet valve 84 to retract to its seat engaging the plunger tube 78 which in turn closes the flow passage through the plunger tube to drain before the main valve 80 has substantially moved from the valve seat 49$^a$. This prevents or substantially minimizes any water hammer from occurring as the main valve 80 leaves its seat 49$^a$.

As the main valve 80 approaches the valve seat 47$^a$ the controlled upward movement imposed by the flow regulator 58$^a$ causes the main valve to squeeze or shut off flow from the inlet 16. This slow controlled closing prevents water hammer as the valve system returns to the service position.

While this improvement has been shown and described as being advantageously applicable to the valve assembly shown in the Schulze et al. application Serial No. 29,478, now Patent No. 3,083,728, it would appear to be applicable to other directional flow valves where similar conditions may occur during regeneration operations for a water softener or conditioner (see FIGS. 3, 4 and 5), especially when used in industrial operations where there is a relatively high water pressure and flow rate. Further, it is not our desire to unnecessarily limit the scope or the utility of the improved features by virtue of this illustrative embodiment.

Having thus disclosed the invention, we claim:

1. A hydraulically-actuated valve assembly, comprising a valve body having a central passage therethrough and closed at its upper end by a cover secured to the valve body, an actuating diaphragm extending across the passage and secured at its periphery between the valve body and the cover, an actuating chamber formed between the diaphragm and the cover, a hollow plunger longitudinally reciprocable in the valve body, an enlarged valve secured to and surrounding the lower end of the plunger, a second diaphragm spaced from said actuating diaphragm bridging the interior of the valve body and centrally secured to said plunger, a cover plate secured to and extending radially outwardly beyond the upper end of said plunger and supporting said actuating diaphragm, said cover plate having a diameter substantially equal to the internal diameter of said central passage and a central depressed portion within said hollow plunger, a valve stem having its upper end extending through the depressed portion of the cover plate and secured centrally to said actuating diaphragm so as to reciprocate relative to said valve body and said hollow plunger, and a poppet valve secured to the lower end of said valve stem and sealingly engaging the lower end of the hollow plunger, said valve stem extending through and spaced from said hollow plunger to form a central passage therethrough.

2. A hydraulically-actuated valve assembly as set forth in claim 1, in which said valve body includes upper and lower valve seats for the enlarged valve on said plunger, a by-pass chamber formed between said second diaphragm and said upper valve seat, a central chamber formed between said valve seats, an inlet communicating with said central chamber, a passageway communicating between said central chamber and said actuating chamber, and a pilot valve controlling the supply of fluid under pressure through said passageway.

3. A hydraulically-actuated valve assembly as set forth in claim 1, in which said poppet valve has an upwardly tapering body portion and a generally flat lower surface, a central depending projection on said lower surface, and guide means cooperating with said projection to guide the longitudinal movement of the valve stem.

4. A hydraulically-actuated valve assembly as set forth in claim 1, in which said cover plate supports substantially the entire area of the actuating diaphragm and the area of the diaphragm over the depressed portion of the cover plate is relatively small compared with the total effective area of the diaphragm so that upon application of fluid pressure to said actuating chamber and said actuating diaphragm, the hollow plunger and valve stem will move downward simultaneously until the enlarged valve engages the lower valve seat and then the depressed portion of the cover plate allows the valve stem to move downward relative to said hollow plunger.

5. A hydraulically-actuated valve assembly, comprising a valve body having a central passage extending therethrough and closed at its upper end by a cover secured to the valve body, an actuating diaphragm extending across the passage and secured at its periphery between the valve body and the cover, an actuating chamber formed between the diaphragm and the cover, a valve assembly in said passage including a hollow plunger open at both ends and reciprocable in said valve body, an enlarged valve at the lower end of said plunger, a second diaphragm spaced from said actuating diaphragm bridging the interior of the valve body and centrally secured to said plunger, an intermediate chamber formed between said diaphragms, a cover plate secured to and extending radially beyond the upper end of said plunger and supporting said actuating diaphragm, said cover plate having a diameter substantially equal to the diameter of said passage and a central depressed portion within the upper open end of said plunger, said hollow plunger having a plurality of equi-spaced openings therein communicating with said intermediate chamber, a valve stem extending longitudinally through and spaced from said hollow plunger to form a passage through the plunger, said valve stem extending through and reciprocable relative to said cover plate and hollow plunger with the upper end of the stem secured centrally to said actuating diaphragm, a poppet valve secured to the lower end of said valve stem and adapted to close the lower open end of the hollow plunger, said poppet valve including a resilient body with a generally flat lower surface and upward tapering sides, a central projection depending from said lower surface, upwardly and inwardly extending arms in the passage in the valve body cooperating with said projection to guide movement of the valve stem, spaced upper and lower valve seats in said passage for said enlarged valve, a main chamber between said valve seats, a source of fluid pressure communicating with said main chamber, an actuating pressure passage communicating between said fluid pressure source and said actuating chamber, and a pilot valve controlling flow in said actuating pressure passage.

References Cited by the Examiner

UNITED STATES PATENTS

| | | | |
|---|---|---|---|
| 607,732 | 7/98 | Burger | 137—630.15 |
| 1,870,058 | 8/32 | Levine | 137—630.19 XR |
| 2,508,064 | 5/50 | Hazard | 137—630.15 XR |
| 2,599,872 | 6/52 | Slonneger | 251—61 |
| 3,006,376 | 10/61 | Schulze | 137—630.19 |

FOREIGN PATENTS 1,044,869    6/53    France.

WILLIAM F. O'DEA, *Primary Examiner.*